United States Patent
Li et al.

(10) Patent No.: US 7,184,666 B1
(45) Date of Patent: Feb. 27, 2007

(54) RECONFIGURABLE OPTICAL ADD-DROP MULTIPLEXER

(75) Inventors: Melissa Li, Los Altos, CA (US); Denis Zaccarin, San Jose, CA (US); Chris Barnard, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 305 days.

(21) Appl. No.: 10/876,487

(22) Filed: Jun. 28, 2004

Related U.S. Application Data

(60) Provisional application No. 60/507,085, filed on Oct. 1, 2003.

(51) Int. Cl.
*H04J 14/02* (2006.01)
(52) U.S. Cl. ............................. 398/83; 398/81; 398/85
(58) Field of Classification Search ............. 398/81–85
See application file for complete search history.

(56) References Cited

U.S. PATENT DOCUMENTS

| | | | |
|---|---|---|---|
| 5,960,133 A | | 9/1999 | Tomlinson |
| 5,974,207 A | | 10/1999 | Aksyuk et al. |
| 6,141,361 A | | 10/2000 | Mears et al. |
| 6,519,064 B1 | * | 2/2003 | Fatehi et al. .................. 398/84 |
| 6,625,346 B2 | | 9/2003 | Wilde |
| 6,687,431 B2 | | 2/2004 | Chen et al. |
| 6,996,307 B2 | * | 2/2006 | Chandrasekhar et al. ..... 385/24 |
| 2003/0002104 A1 | * | 1/2003 | Caroli et al. ................ 359/127 |
| 2003/0215175 A1 | * | 11/2003 | Alavie et al. .................. 385/22 |
| 2003/0223682 A1 | * | 12/2003 | Kinoshita et al. ............. 385/24 |
| 2004/0101236 A1 | * | 5/2004 | Kelly .......................... 385/24 |

OTHER PUBLICATIONS

Soole, J.B.D., et al., DWDM Performance of a Packaged Reconfigurable Optical Add-Drop Multiplexer Subsystem Supporting Modular Systems Growth, IEEE Photonics Technology Letters, vol. 15, No. 11, Nov. 2003, pp. 1600-1602.

Soole, J.B.D., et al. Rearrangeable Optical Add-Drop Multiplexer (ROADM) Filters Implemented in Silica Waveguide Planar Technology, IEEE, 2003, pp. 668-669.

* cited by examiner

*Primary Examiner*—Dalzid Singh
(74) *Attorney, Agent, or Firm*—Clements Walker; Christopher L. Bernard; Tyler S. Brown

(57) ABSTRACT

A reconfigurable optical add-drop multiplexer is disclosed including an optical splitter receiving an input optical signal and splitting the input optical signal into a dropped optical signal and an express optical signal; a wavelength blocker optically coupled to the optical splitter, the wavelength blocker blocking particular wavelengths in the express optical signal; a cassette having a plurality of slots capable of accepting a plurality of pluggable optical filters; at least one pluggable optical filter optically coupled to the optical splitter, the pluggable optical filter filtering wavelengths so as to output a particular wavelength channel from the dropped optical signal; and an optical combiner optically coupled to the wavelength blocker and to an optical add path on which an optical add signal may be carried, the optical combiner combining the express optical signal having particular wavelengths expressed by the wavelength blocker and the optical add signal.

18 Claims, 15 Drawing Sheets

US 7,184,666 B1

RECONFIGURABLE OPTICAL ADD-DROP MULTIPLEXER

This Non-provisional application claims priority on Provisional Patent Application No. 60/507,085, filed on Oct. 1, 2003, the entire contents of which are hereby incorporated by reference.

BACKGROUND OF THE INVENTION

1. Field of Invention

The invention generally relates to optical add-drop multiplexers. More particularly, the invention relates to reconfigurable optical add-drop multiplexers having single channel granularity.

2. Description of Related Art

Most ring-based WDM (wavelength division multiplexed) optical networks deployed today employ a banded architecture where the minimum increment of optical capacity is a band of several wavelengths. This approach makes sense for networks with many wavelengths deployed that may be accessed by fixed optical add-drop multiplexers. The individual wavelengths can be grouped and managed as individual bands to achieve minimal losses when bypassing a node. A significant disadvantage to this banded approach is that wavelengths can be "stranded." A wavelength is stranded when it cannot be used to establish a link between points A and B because one or more of the other wavelengths in the same band is already in use somewhere between A and B. To minimize the number of stranded wavelengths in the network, wavelength pre-planning is necessary, adding a layer of complexity for communications carriers.

Another issue with the conventional banded architecture is that bands are frequently under-filled. Even if a small number of wavelengths are required for a requested connection between two nodes, a whole band will be dedicated to that connection.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

A ROADM (reconfigurable optical add-drop multiplexer) with single wavelength add-drop capabilities at a node would eliminate the problems of wavelength stranding and underutilization of bands. Arbitrary wavelengths can pass through the node or be dropped/added at the node. The reconfigurability of an ROADM according to the invention may come in a variety of forms such as, but not limited to the following: a wavelength blocker filter, a set of multiplexing and demultiplexing waveguide gratings with ×2 switches in between, or a module that allocates arbitrary wavelengths amongst its several output ports.

Several possible methods of implementing an ROADM according to the invention are offered below. They include pluggable single-channel WDM (or DWDM (dense wavelength division multiplexing)) filters on the drop side, and may interface with pluggable tunable transmitters or transceivers, and tunable filters. The capacity for the desired wavelength is added to the node only when it is needed. Likewise, such capacity may be easily and conveniently subtracted from the node in response to declining demand.

Figure 1:
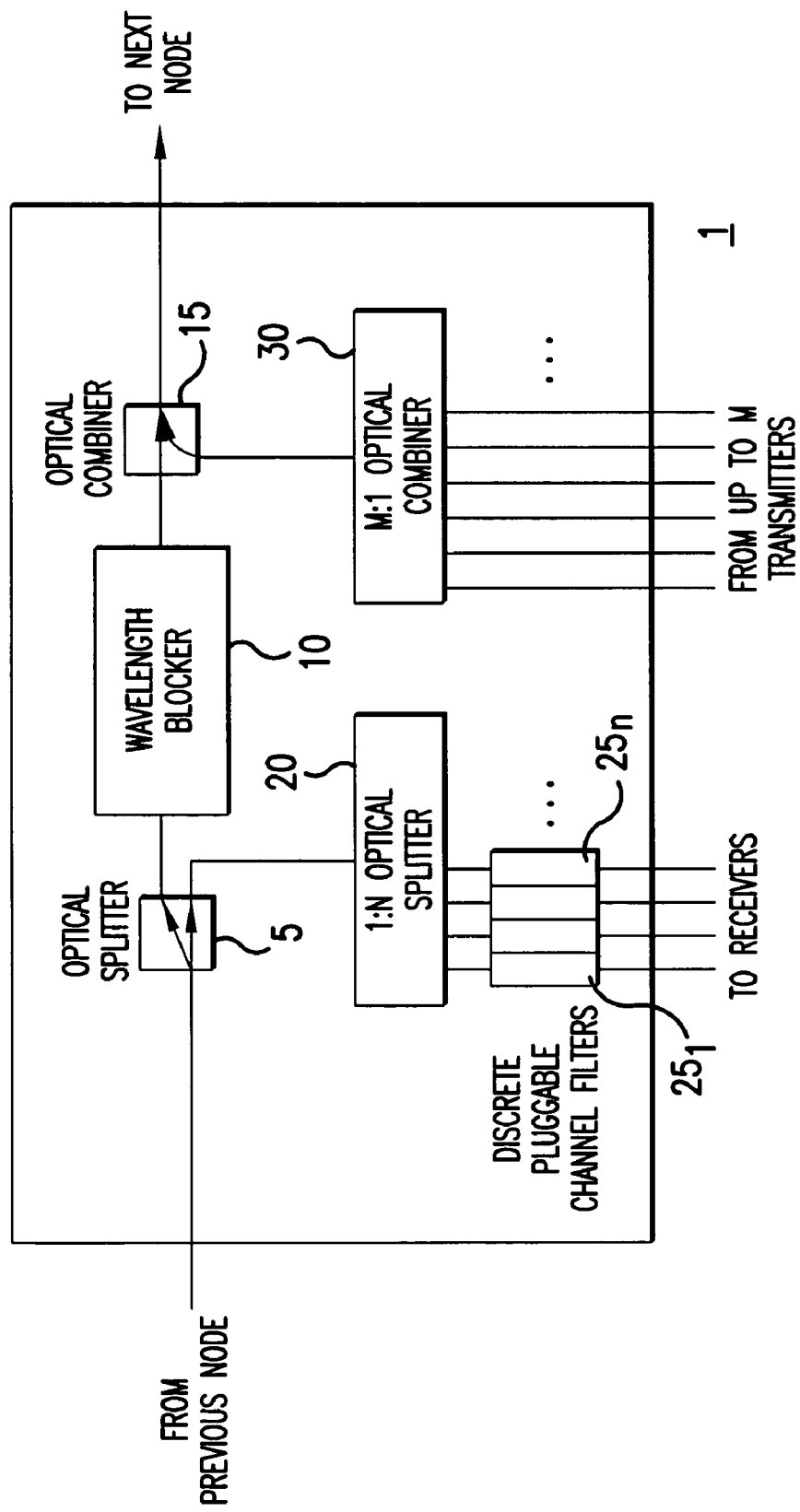
FIG. 1 is a block diagram of a reconfigurable optical add-drop multiplexer according to a first aspect of the invention.

FIG. 1 is a block diagram of a first aspect of a reconfigurable optical add-drop multiplexer 1 according to the invention. As shown therein, the ROADM 1 receives an optical signal from the previous node and outputs an optical signal having certain wavelength channels dropped and/or added to a next node in an optical network.

The ROADM 1 includes an optical splitter 5 optically coupled to an input port of the ROADM 1. The optical splitter 5 is a conventional, off-the-shelf component that splits the optical power of the input optical signals, generally into two equal parts but such a power splitting ratio is not necessary for proper operation of the invention. A first part of the split input signal is sent along an express optical path through the ROADM 1. This express optical path includes a wavelength blocker 10 that is interposed between the optical splitter 5 and the optical combiner 15.

The wavelength blocker 10 is another conventional element in and of itself and may be constructed with a variety of devices such as, but not limited to, a reconfigurable blocking filter (RBF) such as the RBFs described in U.S. Pat. No. 6,141,361; 5,974,207; or 5,960,133. Alternatively, the wavelength blocker 10 may be constructed with so-called router technology such as that described in U.S. Pat. No. 6,625,346 or 6,687,431 or the like.

The RBF, wavelength router and similar wavelength blocking technology are collectively and variously referred to herein as a wavelength blocker 10. The wavelength blocker 10 generally functions to block certain wavelengths or certain wavelength bands such that they do not reach the optical combiner 15. This is generally done to prevent the overlap of signals carrying the same wavelengths that may be added on the add path via the optical combiner 15.

In addition to the express optical path in the ROADM 1, there is a drop path that generally follows from the optical splitter 5 (downwards in the figures) towards optical dropping elements including the 1:N optical splitter 20 and pluggable discrete channel filters $25_1$–$25_N$.

There is also an add optical pathway in which optical channels may be added via the M:1 optical combiner 30 and optical combiner 15 for output to the next node in the optical network as shown.

As briefly mentioned above, the ROADM 1 further includes a 1:N optical splitter 20 which is optically coupled to the optical splitter 5. The 1:N optical splitter 20 serves to split the dropped optical signal containing all wavelengths channels into N copies of the dropped optical signal. The 1:N optical splitter 20 is another conventional element that may be purchased off the shelf. The 1:N splitter 20 has N outputs to which may be connected 1 or more pluggable discrete channel filters $25_1$–$25_N$. More specifically, each of the pluggable discrete channel filters 25 may be connected to a corresponding one of the outputs of the 1:N optical splitter 20. The pluggable discrete channel filters $25_1$–$25_N$ may be constructed with thin film filters or equivalent technology.

It is noted that thin film filters are not the only choice for the channel filters. Any technology allowing the splitting of signals based on their frequency can be used. The term "thin film" refers to dielectric being used. Other filter types consistent with the invention can be used such as filters written or otherwise manufactured on waveguides and made of silica/silicon for example. Filter structures can consist of Mach-Zhender type, or other architectures, where light properties such as phase and amplitude are adjusted so that peak of resonance or suppression for specific frequencies are used. Thin film filters would, at the present time, be the most economical in a single granularity case but is not the only possibility.

The term "pluggable" is used herein to denote the ability to install and remove an individually packaged filter element after the ROADM's initial deployment in an optical network. In other words, each of the pluggable channel filters $25_1$–$25_N$ may be easily plugged into and removed from the ROADM 1. To facilitate such a pluggable structure and functionality, a cassette such as that shown in FIG. 11 and further described below may be utilized.

It is emphasized that single-channel pluggability allows the user to add/drop channels at the node without disrupting traffic on existing channels that are not affected by the change. This may not be the case for a banded architecture.

In other words, "pluggability" is used to express that upgradeability can simply be done by "adding" or "plug-in" new filters or splitters for expansion ports as required, on a single channel basis. In all the cases this upgrade is done without affecting pass-through traffic. In most of the cases, this upgradeability is done without affecting traffic being dropped or added (the exception being the daisy chain configurations). Stated in yet another way, "pluggability" is used here in terms of upgradeability with very small granularity such as a single channel, and flexibility to use any wavelength (not stranded).

Each of the pluggable channel filters $25_1$–$25_N$ functions to filter a single wavelength channel from the WDM signal on the drop path. Since the 1:N optical splitter 20 splits the WDM drop signal into N parts all WDM channels are present at the input to each of the pluggable discrete channel filters $25_1$–$25_N$. Each of the filters $25_1$–$25_N$ then filters out a single wavelength channel for output to corresponding receivers (not-illustrated) that perform a convention optical-to-electrical (O/E) conversion. Alternatively, the dropped, filtered wavelength channel may be routed to another network without such an O/E conversion.

On the add pathway, the ROADM 1 may receive up to M wavelength channels from a corresponding number of optical transmitters (not shown). These individual optical channels to be added to the WDM signal output are fed to an M:1 optical combiner 30. The M:1 optical combiner is quite similar to the 1:N optical splitter 20 and indeed the very same type of element may be used as a splitter or combiner as is well known in the art. The M:1 optical combiner 30, like the 1:N optical splitter, may be a single stage device or may be multi-stage device to permit a greater number of signals to be split or combined as further discussed below in relation to FIG. 7. The M:1 optical combiner 30 on the add path is connected to an optical combiner 15 that combines the added optical channels to the channels present on the express optical pathway that have not been blocked by the wavelength blocker 10. The fully combined signal is then supplied to the next node as further shown in FIG. 1.

Further operational details for FIG. 1 follow.

FIG. 1 shows one way in which ROADM 1 with a single channel add/drop capability may be implemented at a network node. Multiple wavelengths of traffic enter from the top left part of the diagram. Part of the WDM input signal splits off into the lower left hand side of the figure and is further split into N copies by the 1:N optical splitter 20, one copy at each of the N output ports of the splitter 20. Each wavelength that is detected by this node is selected by passing through a single wavelength WDM channel filter 25. This channel filter 25 is preferably a pluggable module inserted into a cassette already set up in the telecommunications bay (or shelf) or it can accompany the receiver of a transponder card to be plugged into a shelf. No pre-planning of dropped wavelengths at the node is necessary with such a design, since each dropped wavelength is accessed only when needed. Removal of a dropped channel simply requires one to unplug the specific channel filter 25 from the cassette or the channel filter-receiver module from the shelf, while the rest of the traffic remains unaffected.

The same principle is at work on the add-side of the node. When needed, the transmitter with the appropriate wavelength is inserted into the shelf and connected to one of the M input ports of the M:1 optical combiner 30. Note that M and N may or may not be equal.

It is emphasized that this architecture is wavelength-port-flexible: the node can access any wavelength on the line at any of the N-drop ports and add any wavelength to the line on any of the M-add ports. The add and drop ports are not wavelength specific. When compared to other architectures using large scale arrayed waveguide filters that specify the wavelength at each input or output port, pluggable filters 25 offer flexibility and advantage in space and cost savings.

Figure 2:
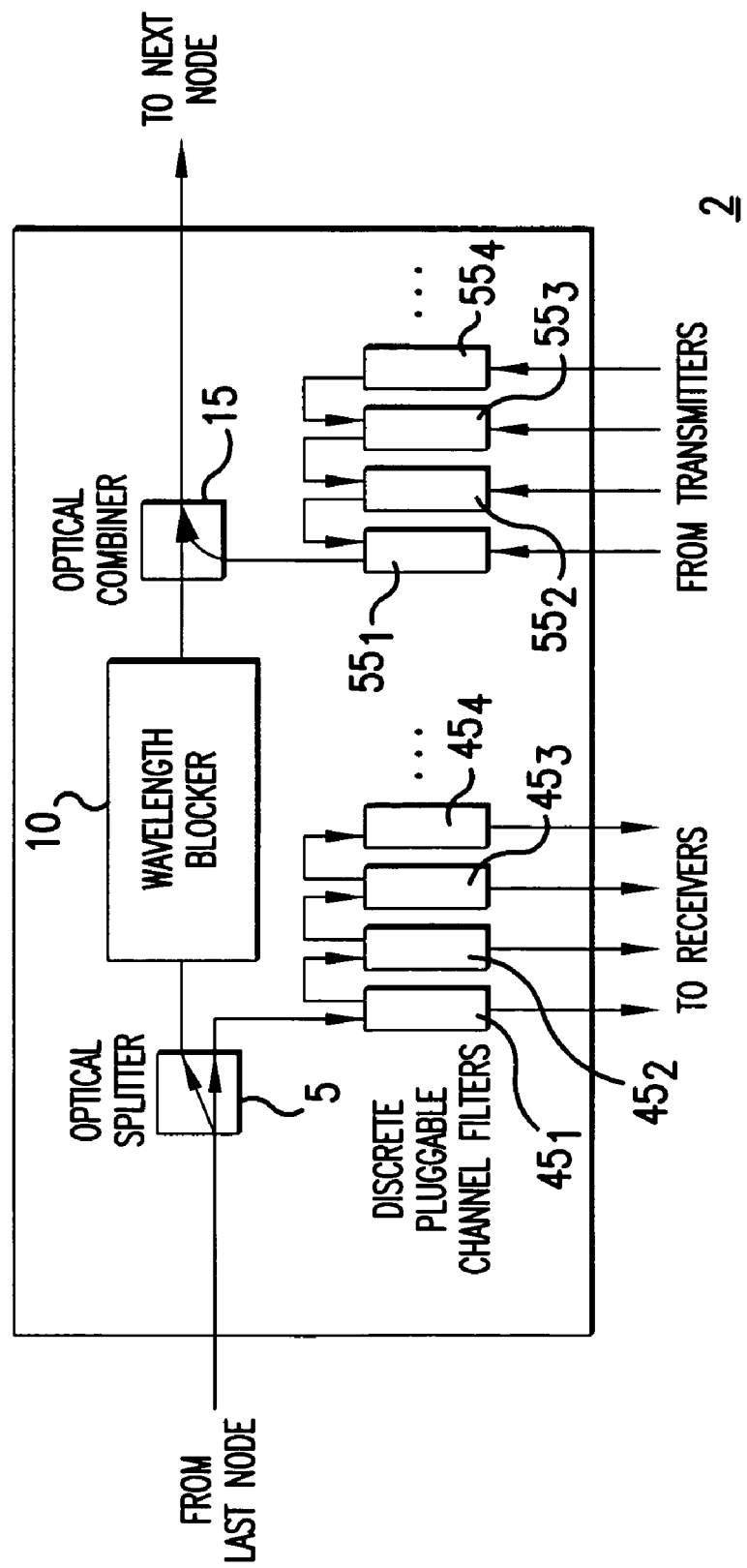
FIG. 2 is a block diagram of a reconfigurable optical add-drop multiplexer according to a second aspect of the invention.

FIG. 2 is a block diagram illustrating another way to construct an ROADM according to the invention. As shown therein, ROADM 2 includes many of the same components as the ROADM 1 of FIG. 1. Thus, a further description of these like elements will be omitted here for efficiency.

As compared with FIG. 1, the FIG. 2 ROADM 2 utilizes different components on the add and drop paths. Specifically, a daisy chain of pluggable 3-port discrete channel filters $45_1$, $45_2$, $45_3$, and $45_4$ are connected as shown. Instead of utilizing an optical splitter 20 as in FIG. 1, the FIG. 2 embodiment utilizes this daisy chain of pluggable discrete channel filters 45. Each of these channel filters 45 is a three port device that outputs a filtered wavelength while reflecting the remainder of the wavelengths to an upgrade port for further processing by the next filter in the daisy chain.

Likewise, the ROADM 2 shown in FIG. 2 also utilizes a daisy chain of channel filters $55_1$, $55_2$, $55_3$, and $55_4$ for the add path. Additional channel filters 55 may be added to increase the capacity of the added channels. Likewise, additional pluggable discrete channel filters 45 may be added in the daisy chain to further add to the capacity of the dropped channels. Further details of the ROADM 2 and its operation follow.

It is noted that the add filters such as the daisy chain of channel filters $55_1$, $55_2$, $55_3$, and $55_4$ for the add path and are not necessary for the invention to operate and are, therefore, considered optional. Using filters on the add path may allow a lower insertion loss for the ROADM as compared with using a combiner 30. Indeed, the filters on the add side serve two functions: (1) to reduce the insertion loss compared to the splitter 30 and (2) to reject a wavelength from the wrong transmitter (e.g. such as when a technician has incorrectly connected the network or an upstream optical element such as an optical switch has incorrectly routed one or more wavelength channels).

Indeed, the preferred implementation is to use the M:1 combiner 30 on the add side. The daisy-chain add filters are included to cover one such way to implement the add. In other words, the daisy chain add shown in FIG. 2 is simply one way of implementing the add function, and the add and drop sides may or may not be symmetric in terms of specific components used some examples of which are discussed in relation to FIGS. 13–17.

Compared to the FIG. 1, the ROADM 2 of FIG. 2 shows a different way of achieving single-channel, pluggable add and drop functionality. Without the 1:N optical splitter, the multiple wavelengths of traffic are directed into the first pluggable single-channel filter $45_1$. Only the wavelength that matches the resonant frequency of this filter $45_1$ will pass through it and arrive at the receiver. Any other wavelengths will be reflected off this filter $45_1$ and arrive at the next pluggable single-channel filter $45_2$. The dropped wavelengths are accessed in a serial fashion up to $45_n$.

Pluggability is achieved with such daisy chained filters as follows. If existing traffic is not to be affected by adding or dropping a channel, the added filter must come at the end of the daisy-chain of filters. Also, channel filters that are not at the end of the chain cannot be removed. If existing traffic can be affected when a new channel is added or dropped (e.g. where optical protection schemes exist), then a filter in the middle of the daisy chain can be removed while the existing traffic is protected and routed elsewhere. For these reasons, the daisy chain implementation is not as versatile as the splitter/combiner implementation.

This scheme in reverse is mirrored on the add side of the node (lower right hand side in FIG. 2.) The disadvantage of this scheme is that the removal of a dropped wavelength whose filter is not at the end of the daisy chain will affect any channels downstream from the removed wavelength. However, if hitless reconfiguration is not a requirement, the advantage compared to the previous scheme is that each drop-wavelength sees less loss.

It should be noted that the diagrams of FIGS. 1 and 2 only serve as examples for a ROADM with single-wavelength add-drop increments. Filters in series need not be implemented on both the drop and the add sides. Combinations of optical splitters and combiners with individual filters or filters in series are equally valid as add/drop architecture, depending on the specific network requirements. A few examples of these variations consistent with the invention are provided below.

Some of other ways of achieving single wavelength add-drop granularity without any pre-defined port-wavelength mapping include the use of tunable filters and tunable transmitters. These solutions tend to be more expensive than fixed-wavelength filters and transmitters but are within the scope of the invention.

Having an ROADM with pluggable single-wavelength granularity at a node without any specific port-wavelength mapping offers the user the maximum flexibility of choosing any wavelength to access while minimizing the number of unused optical ports at the node. This reduces the cost for the node and the overall costs of a network.

The pluggable discrete channel filters 44, 55 may also be constructed with thin film filters much like the pluggable discrete channel filters 25 of the first embodiment shown in FIG. 1 and including all of the variations mentioned above. Alternatives include any wavelength-based filters. Other technologies include the acousto-optic modulator (although it is expensive and rather unwieldy compared to thin film filters, at least with respect to technology now available).

To further illustrate the operation and advantages of the invention, several network diagrams are provided.

This section illustrates a few examples of how a ROADM architecture might be deployed in an optical network and the flexibility this invention offers when demand for wavelengths changes at a node.

Figure 3:
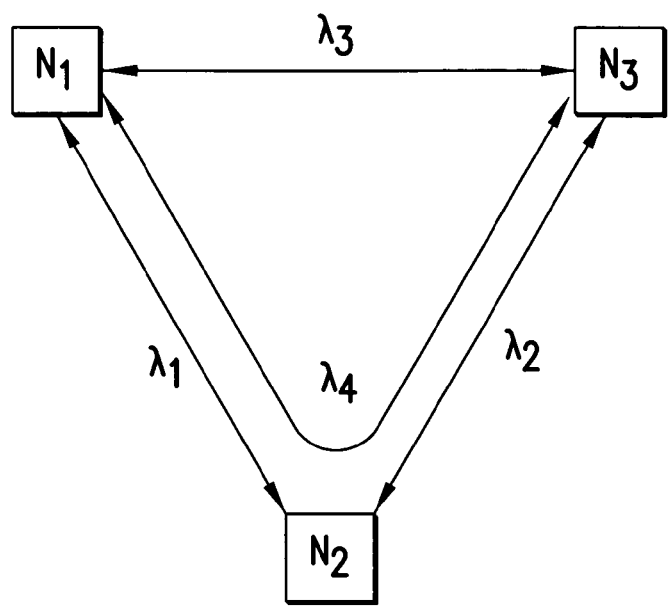
FIG. 3 is a high level diagram of an optical ring network having 3 nodes that is useful for illustrating operations of the invention.

FIG. 3 shows a simplified network application using this invention and includes a three-node ($N_1$, $N_2$, $N_3$) ring network with bidirectional connections between each node using three wavelengths (denoted by the Greek symbol lambda λ). The fourth wavelength is used for a connection between $N_1$ and $N_3$ that passes through $N_2$. The optical architecture for node $N_2$ is shown below in FIG. 4. Filters are plugged into the ROADM of the invention to drop λ1 on the left side and λ2 on the right side. The reconfigurable device (wavelength blocker 10) is configured to pass through λ4.

Figure 4:
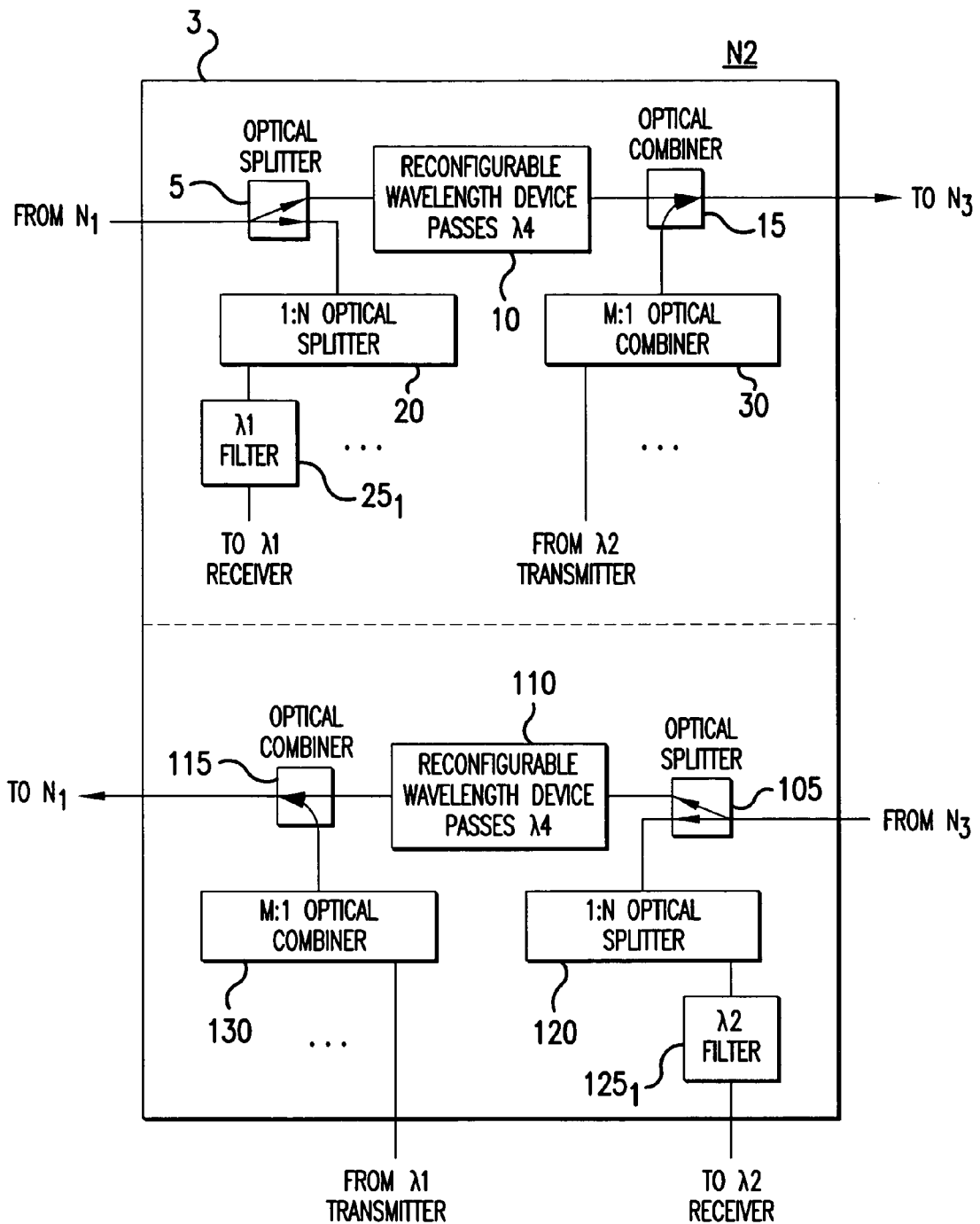
FIG. 4 is a block diagram of a bidirectional reconfigurable optical add-drop multiplexer according to a third aspect of the invention.

FIG. 4 illustrates a bidirectional version of the ROADM 1 illustrated in FIG. 1. The bidirectional ROADM 3 essentially includes two copies of the ROADM 1 with the upper half being relatively identical to the FIG. 1 embodiment. The lower half, which serves the inner ring in a ring network (or another direction in a linear network), duplicates the elements of the top half in mirror image. As shown therein, the bottom half of the ROADM 3 includes an optical splitter 105 that receives the WDM signal from node $N_3$ and drops a copy of the WDM signal to the drop path where it encounters the 1:N optical splitter 120. Only a single pluggable channel filter is shown in FIG. 4, namely the λ2 filter $125_1$. Of course, a plurality of other such pluggable channel filters may also be provided.

As further shown therein on the add path, a single add channel λ1 is received from a transmitter (not shown) by the M:1 optical combiner 130. Again, additional wavelength channels may be fed into the M:1 optical combiner 130 as further mentioned above. This added channel λ1 is combined with the express channels via the optical combiner 115 and output to node $N_1$. On the express path, a reconfigurable wavelength device (wavelength blocker 110) is configured to pass wavelength channel λ4. The reconfigurable wavelength device 110 is just another name for the wavelength blocker 10 variations of which are further discussed above.

Figure 5:
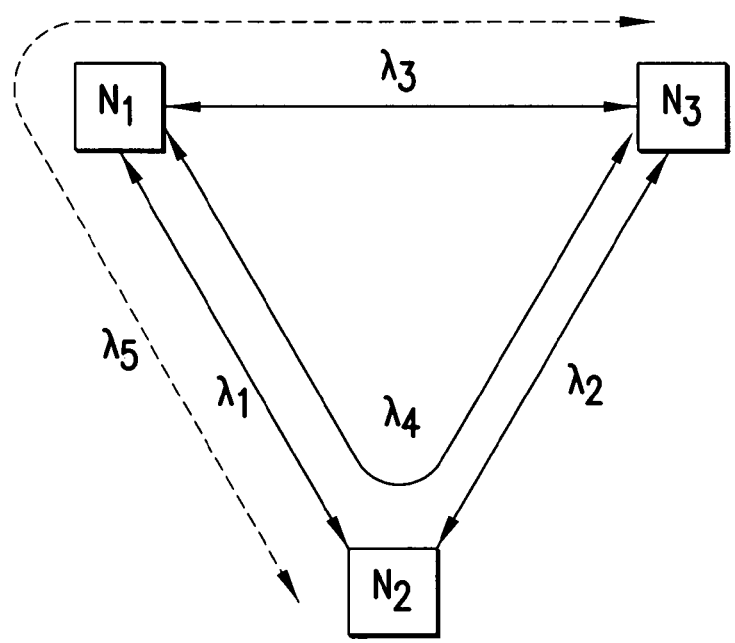
FIG. 5 is a high level network diagram of an optical ring network further illustrating operations of the invention with reference to FIG. 3.
Figure 6:
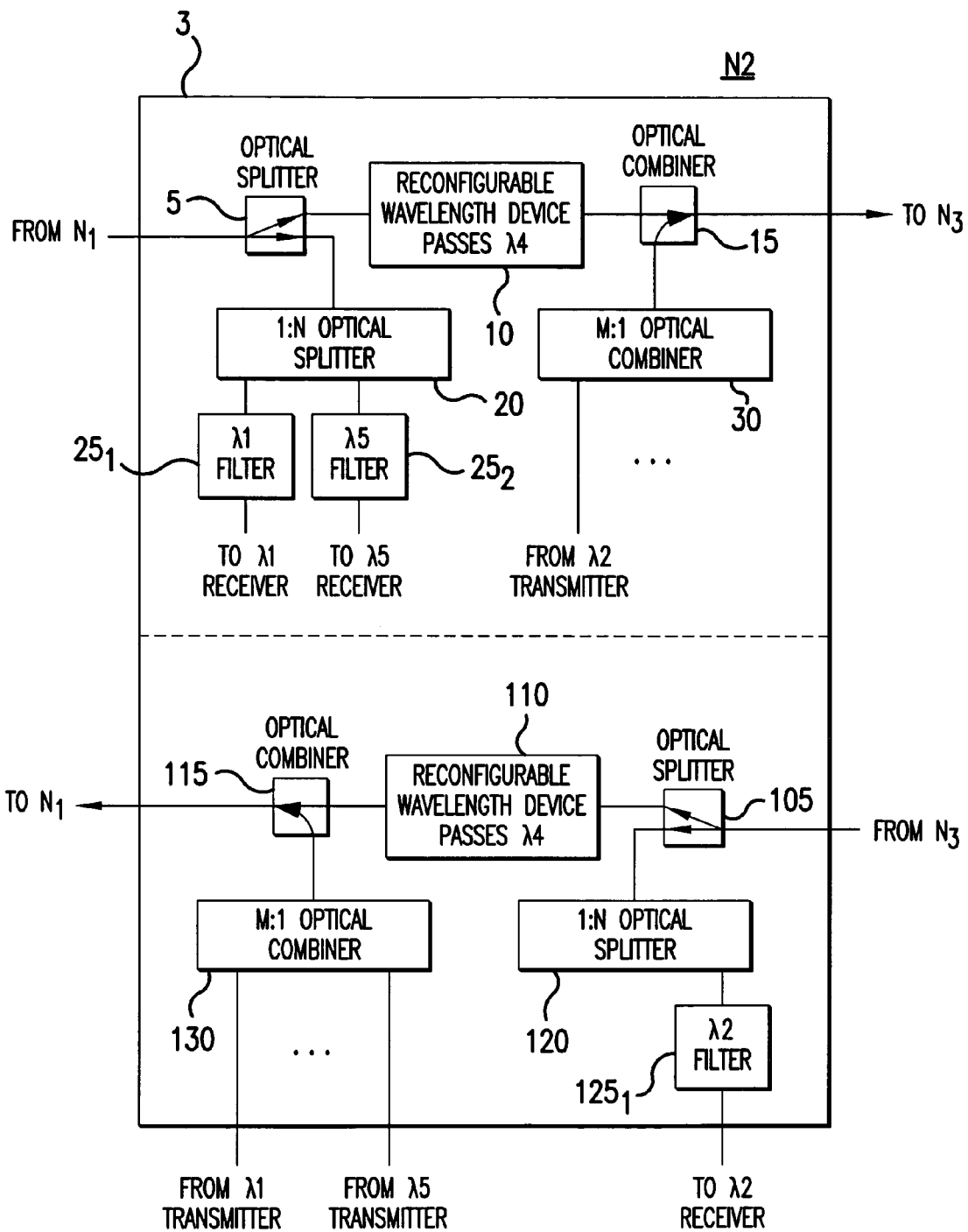
FIG. 6 is a block diagram of a bidirectional reconfigurable add-drop multiplexer according to a third aspect of the invention in further illustrating the addition of a pluggable filter further according to the invention.

FIG. 5 further illustrates the same network illustrated in FIG. 3 but after a new connection is added using a fifth wavelength λ5. For this addition, the wavelength blocker 10 of the ROADM present (but not shown) at network node $N_1$ should be controlled such that it now passes through wavelength channel λ5. Wavelength blocker 10 of ROADM 3 in node $N_2$ doesn't need to be reconfigured. At node 2, the only change is the added $λ_5$ filter in the drop direction as shown in FIG. 6. This is further illustrated by the wavelength diagram shown in FIG. 5. The resulting new configuration at network node $N_2$ is further illustrated in FIG. 6.

The ROADM 3 of FIG. 6 is identical to ROADM3 of FIG. 5 except for the addition for the pluggable channel filter $25_2$ for wavelength channel λ5. In other words, pluggable filter $25_2$ is inserted into ROADM 3 to extract wavelength channel λ5. A similar pluggable filter should also be inserted at network node $N_3$ to also extract wavelength channel λ5. Thus, it is clear that at each node only one piece of hardware (namely, the single wavelength channel filter $25_2$) needs to be inserted and that this can be done without disrupting the other live traffic passing through the node and passing through the ROADM 3 of node $N_2$.

Figure 7:
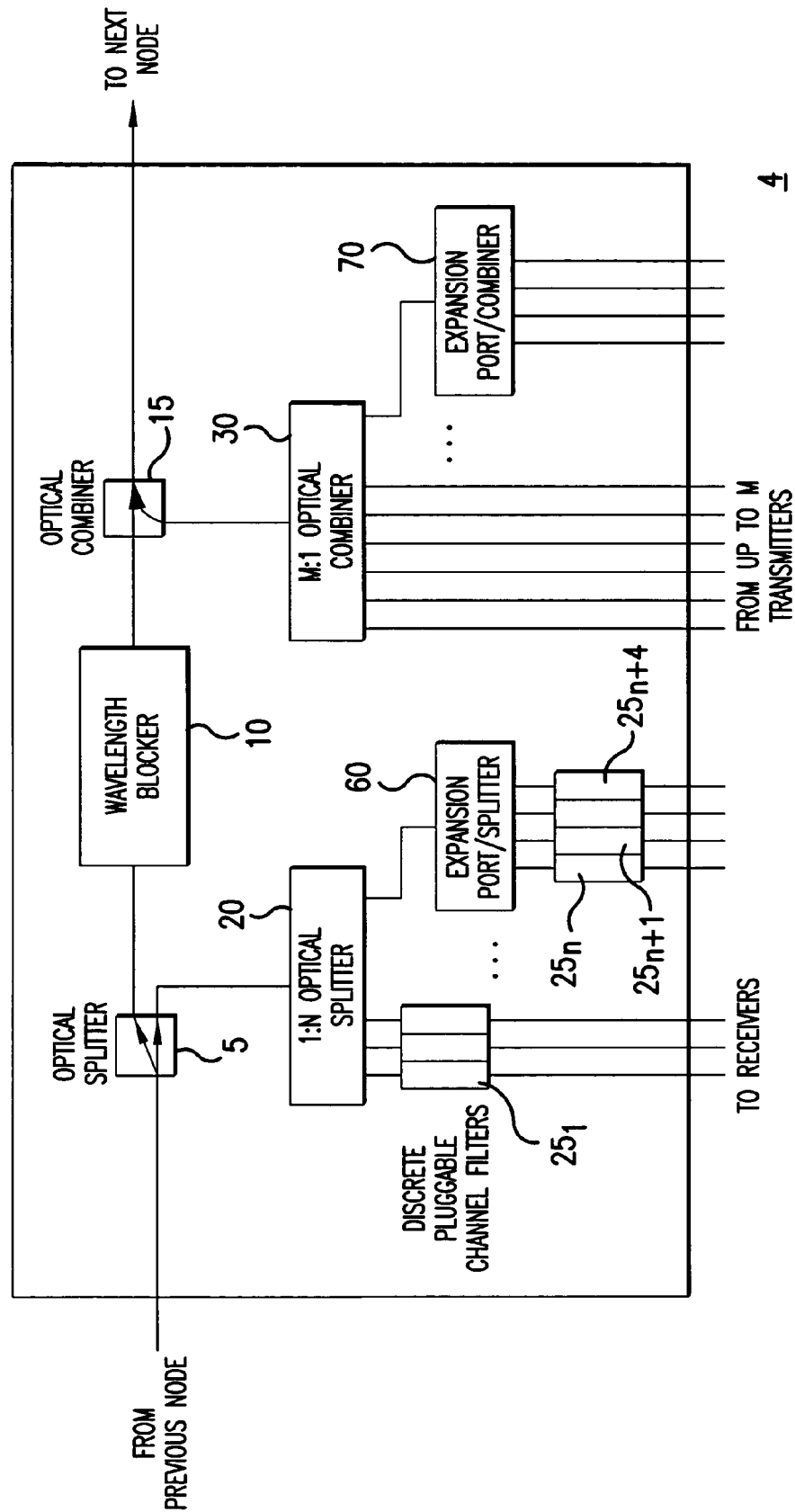
FIG. 7 is a block diagram of another reconfigurable optical add-drop multiplexer according to another aspect of the invention.

FIG. 7 illustrates another variation of the reconfigurable optical add-drop multiplexer according to the invention. As shown in FIG. 7, the ROADM 4 includes many of the same elements as the FIG. 1 embodiment as indicated by like reference numerals. The main difference is the provision of an expansion port/splitter 60 that may be connected to one port of the 1:N optical splitter 20. This expansion port/splitter 60 expands the ability of the ROADM 4 to drop additional channels. As further shown therein, additional pluggable single channel filters $25n$, $25n_{+1}$, or .... $25_{n+4}$ may be plugged into the expansion port/splitter 60. This concept may be expanded to create a tree-like structure of splitters in order to increase the number of wavelength channels that may be dropped.

Likewise and as further shown in FIG. 7, the add path may also be provided with an expansion port/combiner 70 that may be optically coupled to an input of the M:1 optical combiner 30. This expansion port/combiner 70 permits additional wavelength channels to be added to the add path of the ROADM4 without disrupting live traffic carried by the ROADM 4. Of course, it is possible to provide only one of the expansion port/splitters 60, 70 and providing both of them is not necessary.

Figure 8:
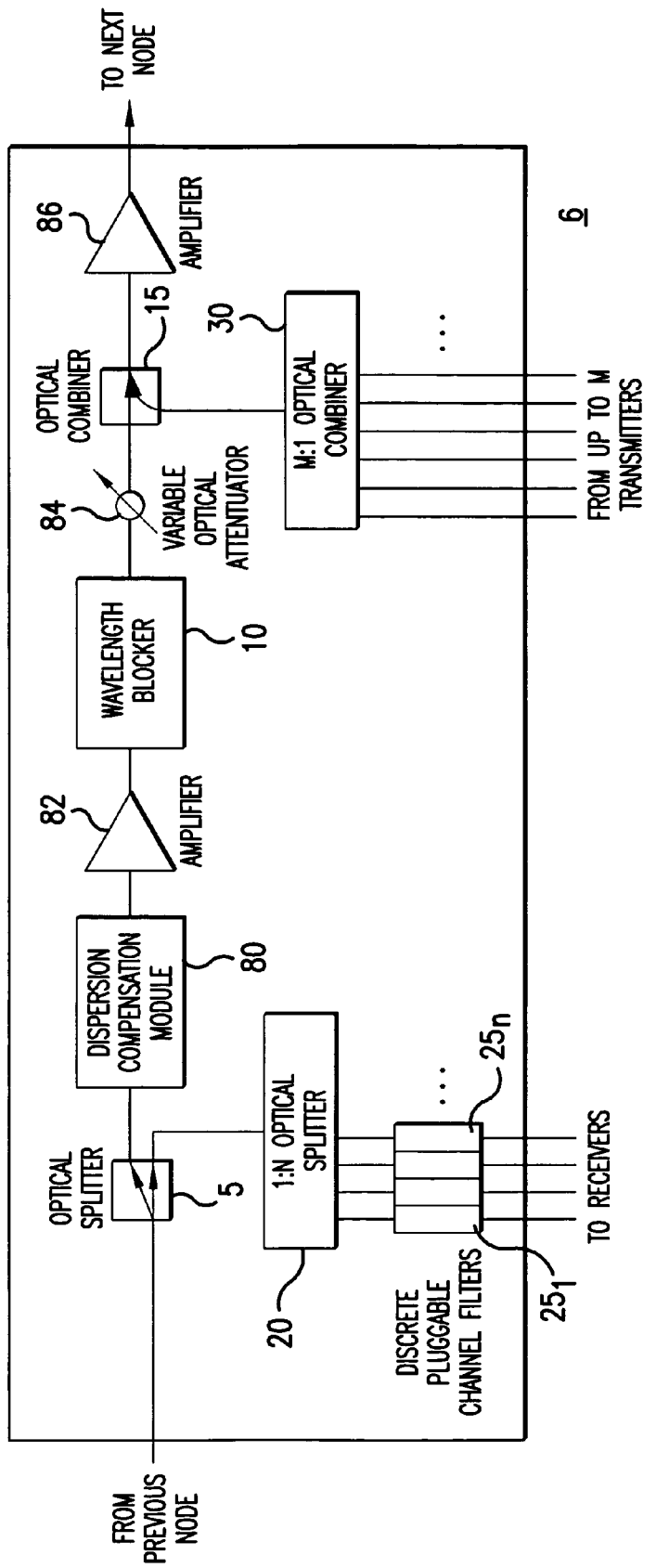
FIG. 8 is a block diagram of yet another reconfigurable optical add-drop multiplexer representing a modified version of the first aspect of the invention.

FIG. 8 illustrates further aspects and components that may be added to the basic ROADM 1 embodiment of the invention. As shown therein, the ROADM 6 may include additional elements such as the dispersion compensation module 80, amplifier 82, and variable optical attenuator 84 as well as the amplifier 86. Each of the dispersion compensation module 80, amplifier 82, and variable optical attenuator 84 are preferably provided along the express path and between the optical splitter 5 and the optical combiner 15. The precise order shown in FIG. 8 is not necessary. In other words, the dispersion compensation module 80, amplifier 82, and variable optical attenuator 84 may be exchanged in their locations. Furthermore, it is not necessary to provide each of these elements together. In other words, it is possible to provide only one or a sub-combination of the elements 80, 82, and 84 to provide additional functionality and advantages.

Specifically, the dispersion compensation module 80 may be utilized to compensate for chromatic dispersion that may occur in the WDM signal traveling on the express path. Such dispersion compensation modules 80 are many and varied and may be purchased off-the-shelf.

Furthermore, the amplifier 82 may be constructed utilizing a variety of optical amplifiers such as EDFAs (Erbium Doped Fiber Amplifiers), SOAs (Semiconductor Optical Amplifiers) or a variety of other known and conventional optical amplifiers. The control of the amplifiers is not shown but is generally preferred to control the amplifier 82 utilizing any one of the many amplifier control techniques existing in the conventional art. Likewise, the variable optical attenuator 84 may be constructed with a variety of convention devices and may be utilize to tune or otherwise reduce the optical power of the express channels. Together the amplifier 82, and variable optical attenuator 84 or perhaps individually these elements may be utilized to control the relative power levels of the express channels as compared with the added channels and drop channels. It is generally advantageous to have a flat power spectrum for all of the channels and such power control elements as the amplifier 82 and variable optical attenuator 84 are quite advantageous for this purpose.

The output amplifier 86 may be utilized to increase the power of all of the WDM channels in order for them to travel a further distance or otherwise be received with a better signal quality.

Furthermore, it is noted that the ROADM 6 may serve as an ASE (Amplified Spontaneous Emission) filter for the amplifier upstream from it. Such reconfigurable devices also can also attenuate each wavelength independently. When used in this fashion, it also serves as a gain flattening filter for the amplifier upstream. Such applications and adaptations are fully within the scope of the invention.

Moreover, one or more optical amplifiers may be placed in the drop and/or add paths, even though they are not shown in the figures. When N (or M) becomes too great, it may become necessary to amplify the split (or combined) signals. Furthermore, VOA(s) and DCM(s) can also be used on the add or drop paths to further control power and limit dispersion. VOAs and optical amplifiers or combinations thereof may be conveniently referred to as optical power control elements herein.

Wavelength Stranding

Figure 9:
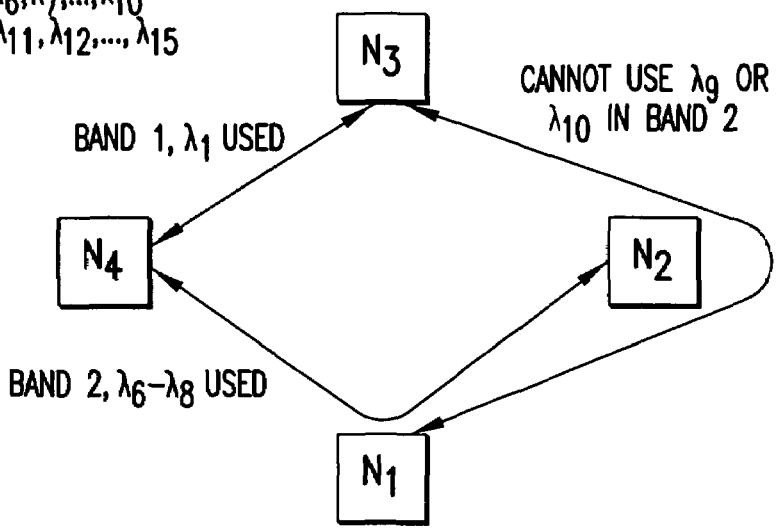
FIG. 9 is a high level diagram of an optical network useful for illustrating the wavelength stranding problem that exists with convention optical add-drop multiplexers.

FIG. 9 illustrates the so-called wavelength stranding problem that exists in the conventional art. As shown therein, an optical ring network having 4 nodes ($N_1$, $N_2$, $N_3$, $N_4$) is shown. There are three wavelength bands, band 1, band 2, and band 3 having the following wavelengths groups therein.

Band 1=$\lambda_1, \lambda_2, \ldots \lambda_5$
Band 2=$\lambda_6, \lambda_7, \ldots \lambda_{10}$
Band 3=$\lambda_{11}, \lambda_{23}, \ldots \lambda_{15}$ In FIG. 9, nodes $N_2$ and N4 are connected by wavelength channels $\lambda_6$ though $\lambda_8$ in band 2. If a direct connection is needed between nodes $N_1$ and $N_3$, $\lambda_9$ and $\lambda_{10}$ cannot be used to establish that link even though they are not in use at node 1. This is because nodes $N_2$ and $N_4$ are already equipped with multiplexers and demultiplexers at band 2 that would prevent any through traffic on $\lambda_9$ and $\lambda_{10}$ to pass through the node unimpeded. In this example, $\lambda_9$ and $\lambda_{10}$ are "stranded." The network designer would have to either open up band 3 to establish the direct link between nodes 1 and 3 or reuse band 1, depending on whether protection schemes are involved.

Figure 10:
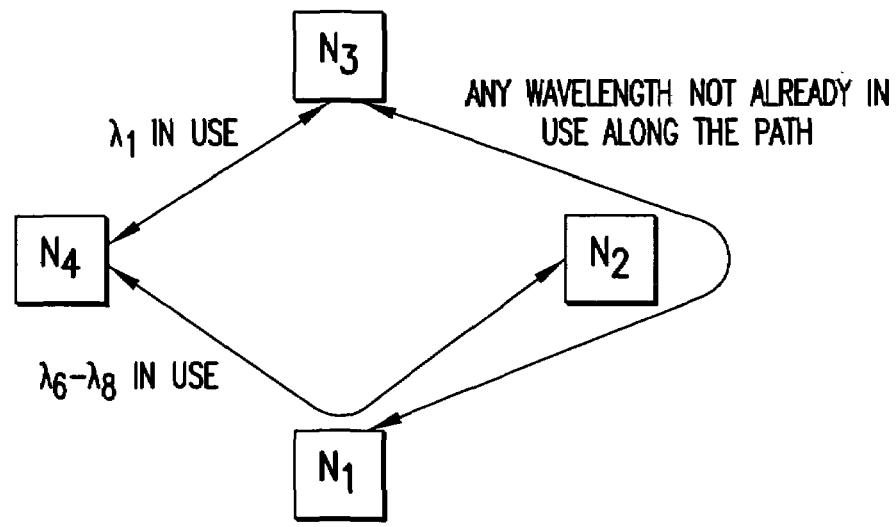
FIG. 10 is another high level network diagram with an optical ring network showing how the various aspects of the invention would eliminate the wavelength stranding problem of the conventional art.

FIG. 10 illustrates how the invention would eliminate such wavelength stranding that exists in the conventional art.

With the implementation of the invention, many possibilities open up for the connection between nodes 1 and 3 in the example above. The band multiplexers and demultiplexers are no longer needed. In establishing the direct link between nodes N1 and N3, the only restriction in wavelength selection is that it cannot be in use along the path. In the example above, this means any wavelength except for $\lambda_6$ through $\lambda_8$.

Figure 11:
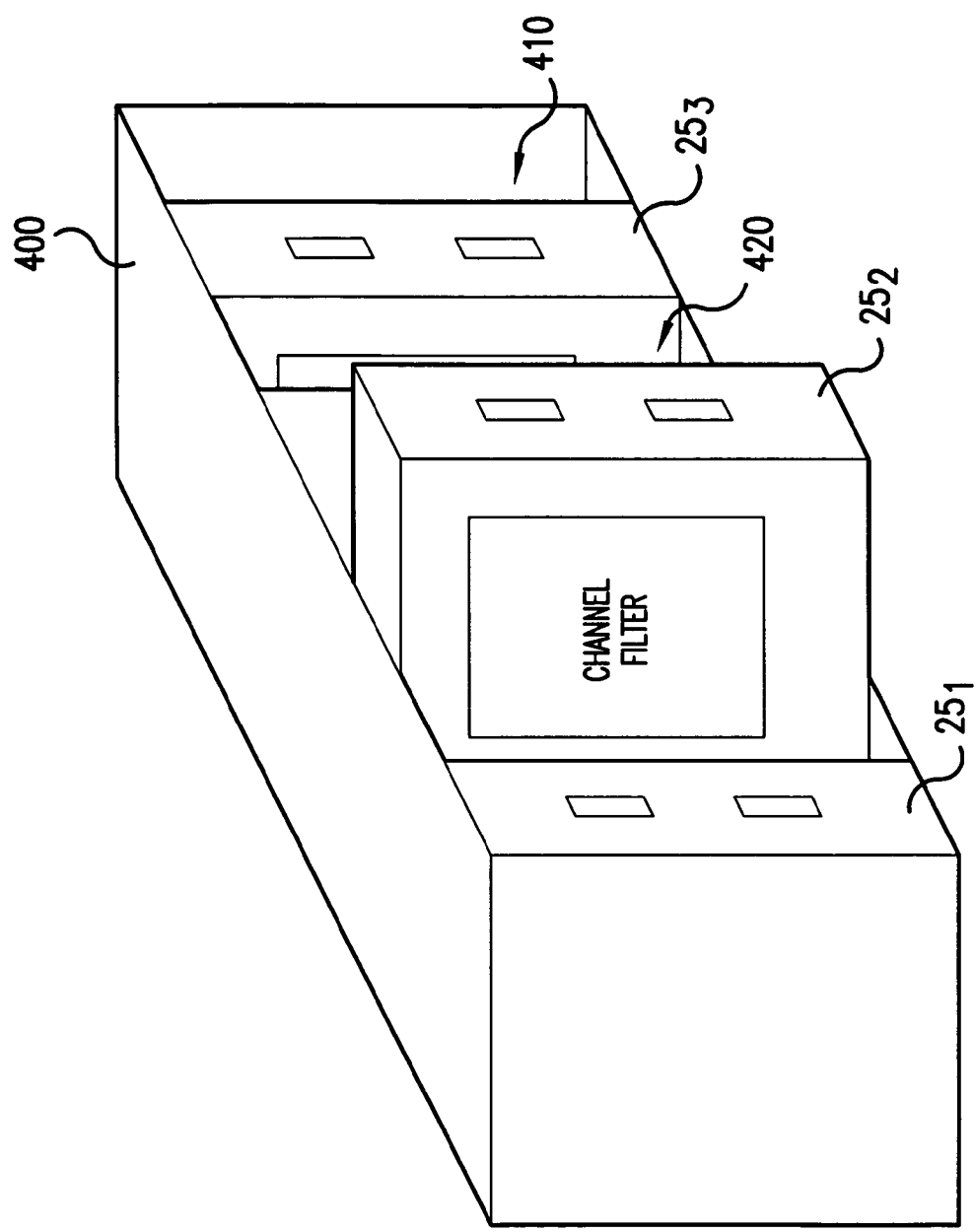
FIG. 11 is a mechanical diagram illustrating the pluggable cassette feature of the invention that is preferably utilized with all of the aspects of the invention.

FIG. 11 further illustrates a pluggable cassette 400 that is a preferred implementation of the invention. As shown therein, a cassette 400 includes a plurality of slots 410 and appropriate optical connectors (not shown) that may accept the channel filters such as channel filters $25_1$, $25_2$, etc. This cassette 400 permits the easy insertion and removing of the pluggable channel filters. The FIG. 11 diagram shows one channel filter $25_2$ being inserted in cassette 400 that is already populated with two other pluggable channel filters $25_2$, $25_3$. It is further noted that the slots 410, 420 on the far right of the cassette and the third from the right are empty thereby providing expansion possibilities for additional pluggable channel filters.

The cassette/chassis 400 shown in FIG. 11 is only one example of how to hold the channel filters in one node. Filters can be put also in a fiber tray like that found in conventional telecom equipment. The cassette 400 shown in FIG. 11 is only a way of making sure this is not hanging in the "air". It is emphasized that one saves real estate and cost when the port-wavelength assignment is not fixed a priori, so that one would not have to populate each node with a 40 slot cassette/chassis to only access a maximum of say, 6 wavelengths.

Figure 12:
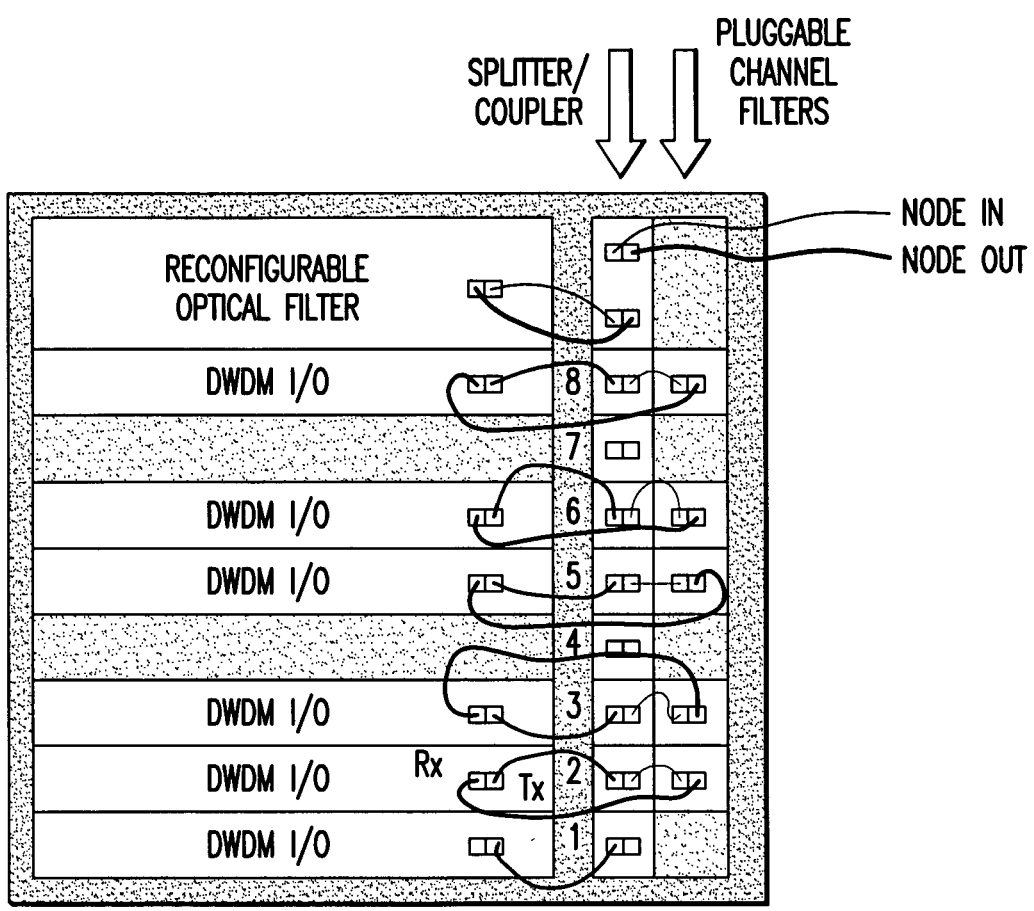
FIG. 12 illustrates a possible implementation of a node architecture according to a first aspect of the invention in further illustrating the layout and cabling that may be utilized to construct the invention.

FIG. 12 illustrates one of many possible implementations of the node architecture. Specifically, FIG. 12 shows the physical implementation of a telecommunication shelf having various slots accepting telecommunication cards. These cards include DWDM I/O cards as shown as well as the reconfigurable (wavelength blocker 10) optical filters that are utilized by the invention to advantage. The individual pluggable channel filters are also shown. As further therein, the cabling between these elements further illustrates how a telecommunication rack with these pluggable elements may be connected with ease. In general, the single channel filters do not accompany the DWDM I/O circuit packs and the maximum number of wavelengths need not be 8 as shown in FIG. 12.

Figure 13:
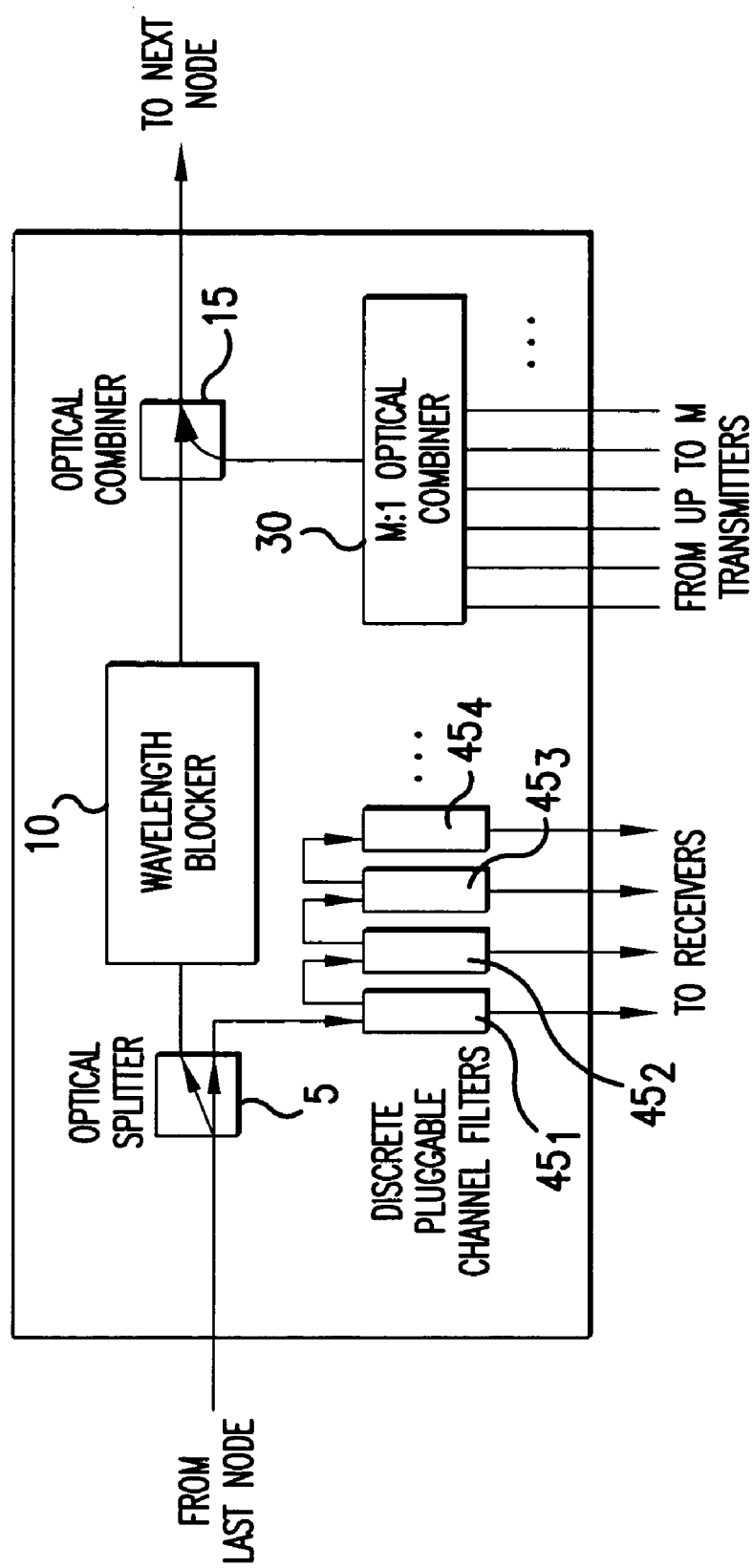
FIG. 13 is a block diagram of a reconfigurable add-drop multiplexer according to yet another aspect of the invention.
Figure 14:
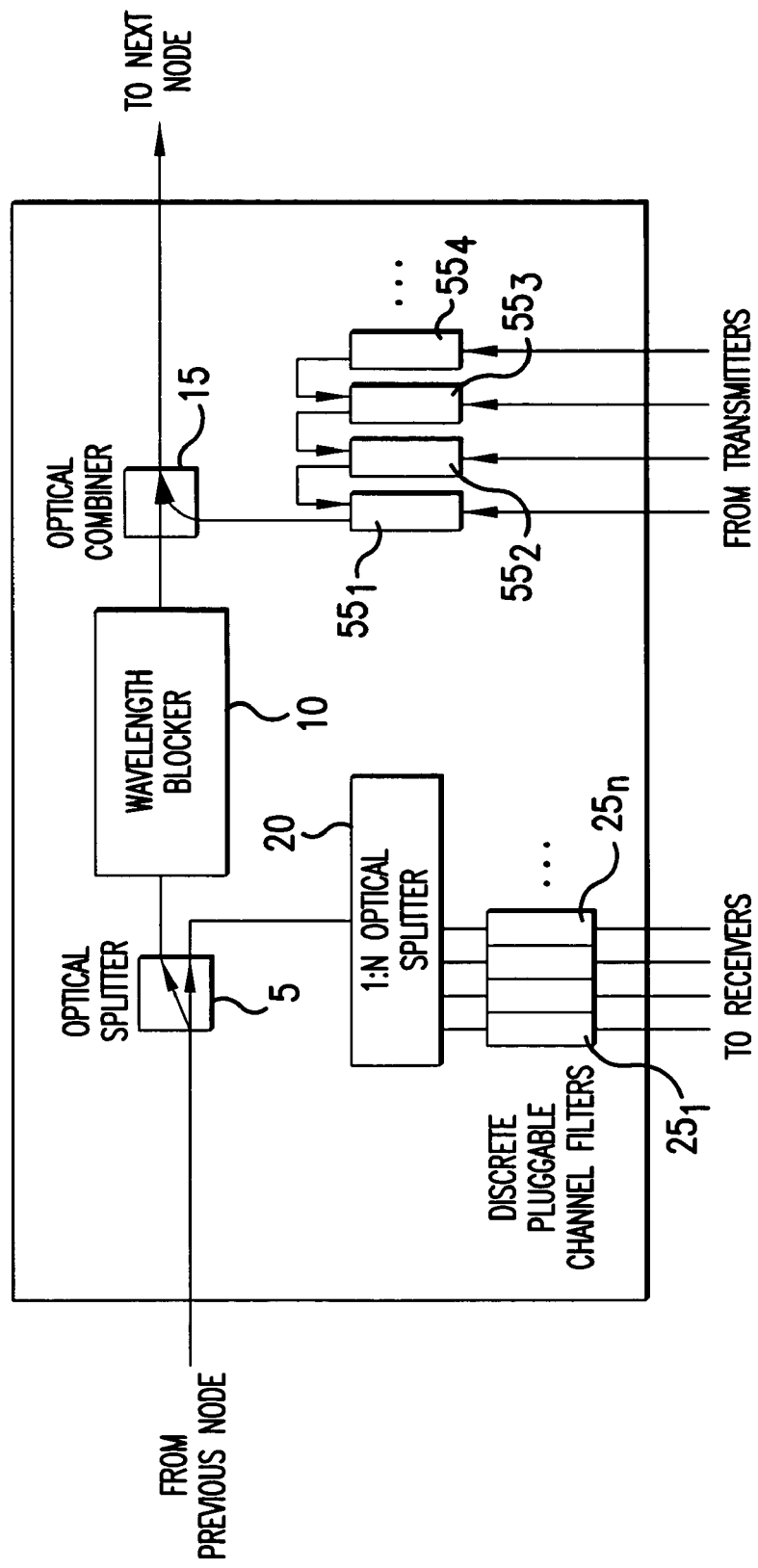
FIG. 14 is another block diagram of a reconfigurable optical add-drop multiplexer according to still another aspect of the invention.
Figure 15:
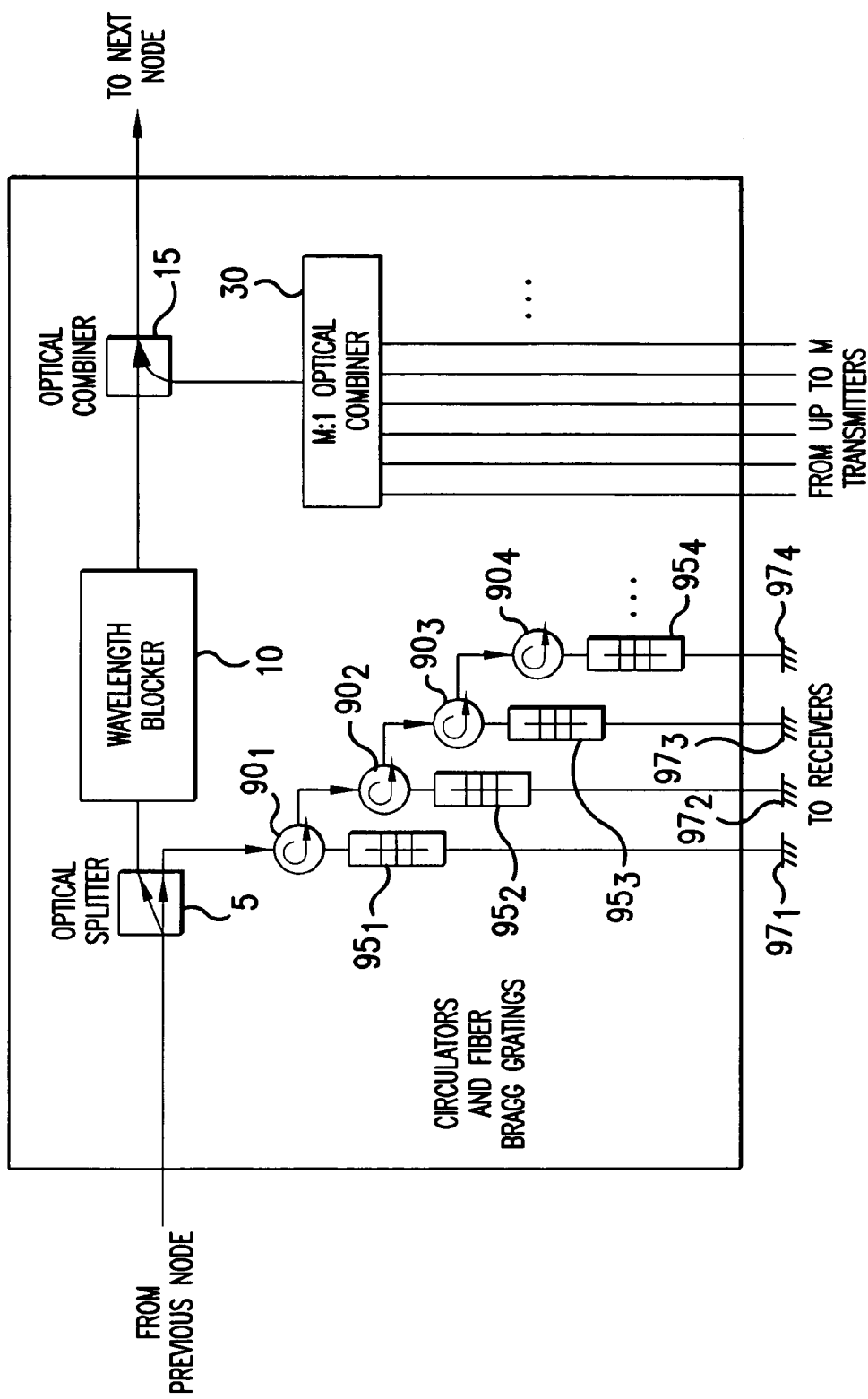
FIG. 15 is a block diagram of a reconfigurable optical add-drop multiplexer according to still yet another aspect of the invention.

FIGS. 13–15 illustrate additional permutations of the basic inventive concepts. Like reference numerals indicate like elements and all of them are borrowed from previous embodiments of the invention. Generally speaking, these figures illustrate mixing and matching of the various ways in which to implement the add path and drop path elements.

More specifically, FIG. 13 utilizes the daisy chain connection of pluggable optical channel filters 45 on the drop path while utilizing the M:1 optical combiner variation on the add path.

FIG. 14 illustrates the optical splitter 20 followed by pluggable single channel filters 25 on the drop path while utilizing the daisy chain of pluggable signal channel filters 55 on the add path.

FIG. 15 illustrates a daisy chain of fiber Bragg gratings (FBGs) 95 and circulators 90 on the drop path while utilizing the M:1 optical combiner for the add path. For each FBG 95 in the daisy chain, an optical circulator 90 connects the reflected wavelengths to a next FBG in the chain.

Figure 16:
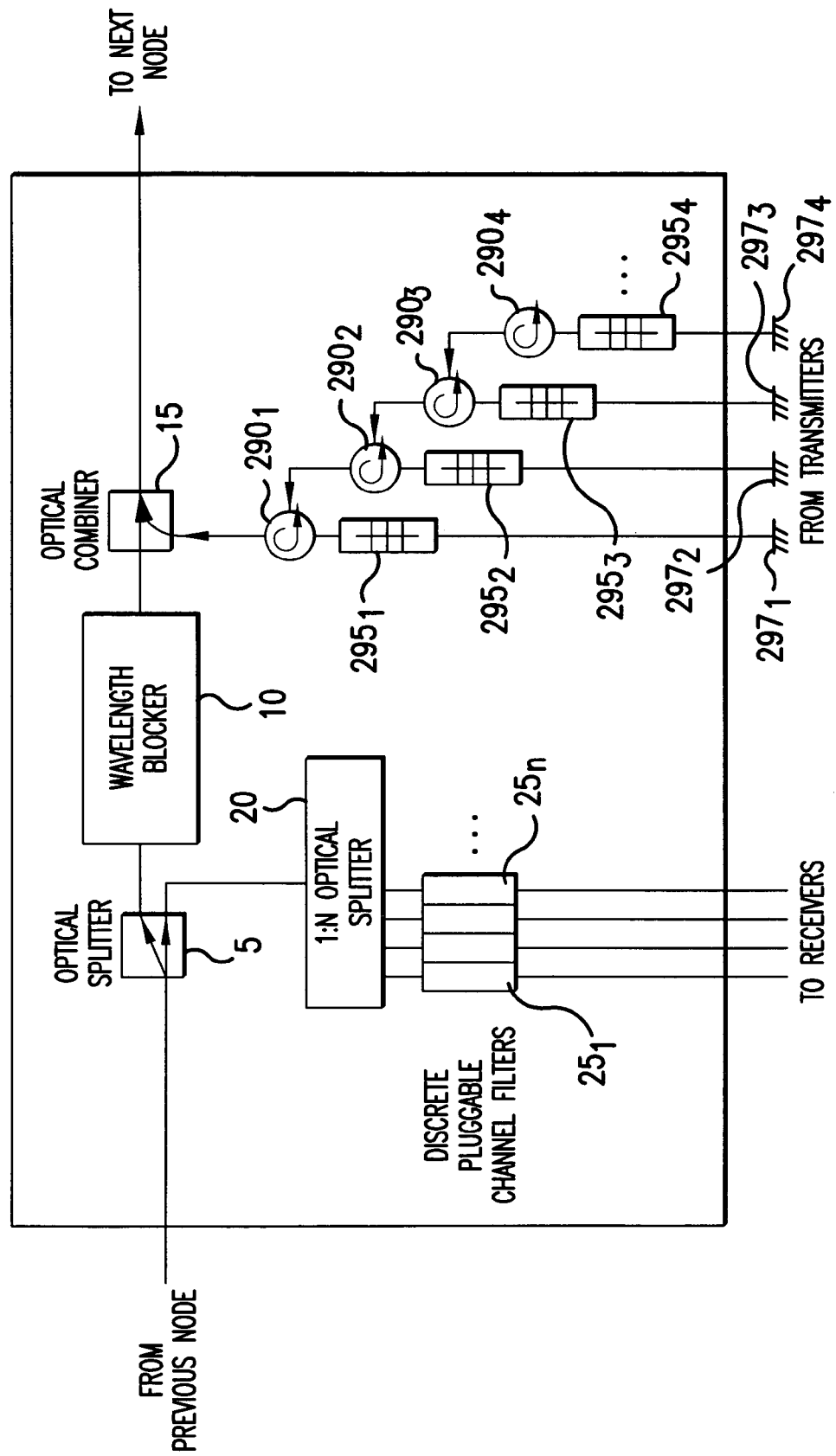
FIG. 16 is a block diagram of a reconfigurable optical add-drop multiplexer according to still yet another aspect of the invention.

FIG. 16 utilizes the 1:N optical splitter 20 into which are plugged the single channel pluggable optical filters 25 on the drop path while utilizing the daily chain of fiber Bragg gratings 95 and circulators 90 on the add path.

Figure 17:
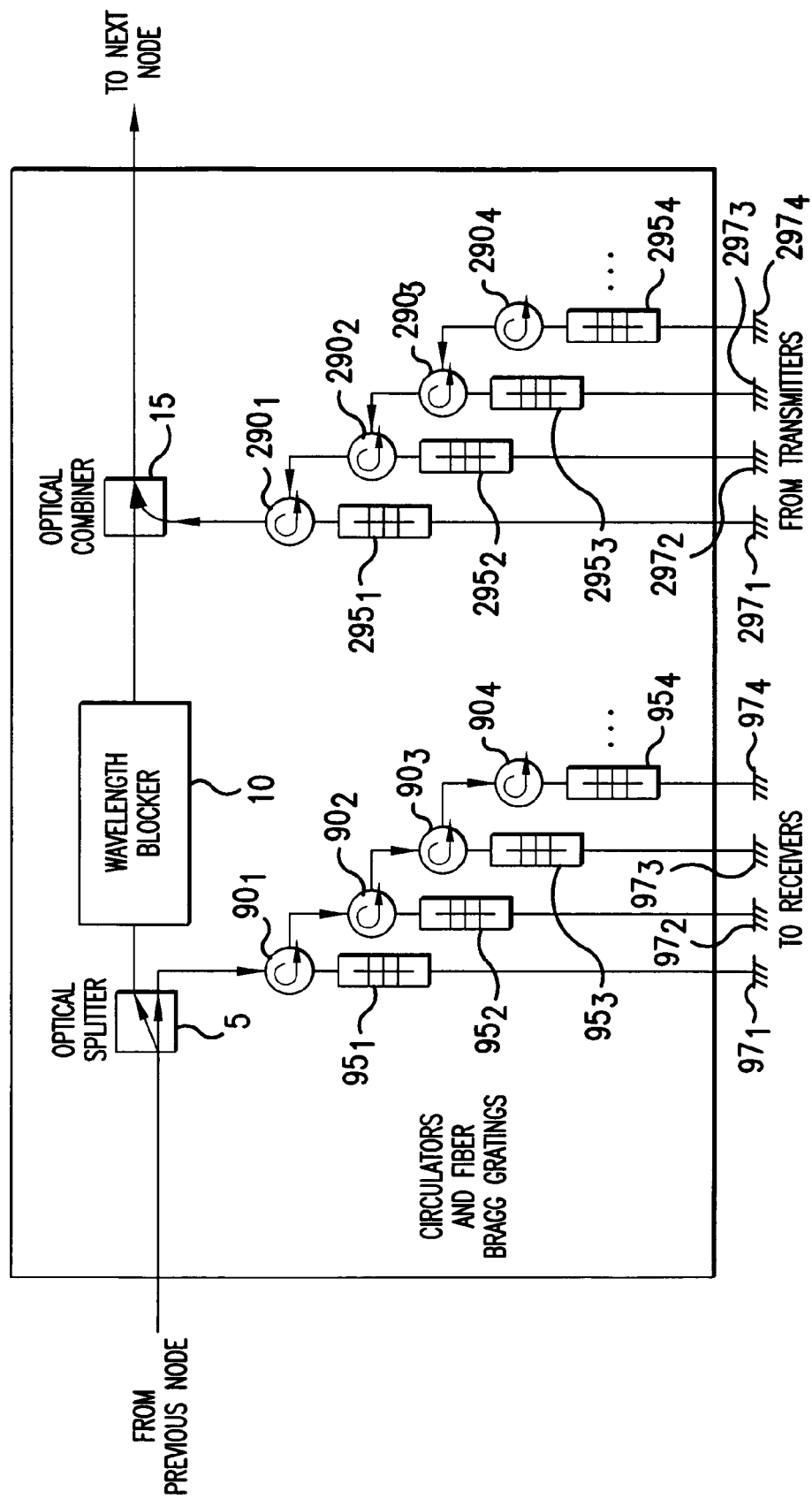
FIG. 17 is a block diagram of a reconfigurable optical add-drop multiplexer according to another aspect of the invention.

FIG. 17 illustrates a daisy chain of fiber Bragg gratings 95 and circulators 90 on both the drop path and the add path. Various other permutations are possible but FIGS. 13–17 are intended to illustrate some of the major variations of the invention.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A reconfigurable optical add-drop multiplexer, comprising:

an optical splitter receiving an input optical signal and splitting the input optical signal into a dropped optical signal and an express optical signal;

a wavelength blocker optically coupled to said optical splitter, said wavelength blocker blocking particular wavelengths in the express optical signal;

a cassette having a plurality of slots capable of accepting a plurality of pluggable optical filters;

a plurality of pluggable optical filters optically coupled to said optical splitter, each of said pluggable optical filters filtering wavelengths so as to output a particular wavelength channel from the dropped optical signal;

a 1:N optical splitter optically interposed between said optical splitter and said pluggable optical filters, said 1:N optical splitter splitting the dropped optical signal into N dropped optical signals at least some of which are respectively coupled to a corresponding one of said pluggable optical filters;

an expansion port/splitter optically coupled to an output port of said 1:N optical splitter, said expansion port/splitter splitting one of the N dropped optical signals at least some of which are respectively coupled to a corresponding one of said pluggable optical filters;

a second cassette having a plurality of slots capable of accepting a plurality of said pluggable optical filters; and an optical combiner optically coupled to said wavelength blocker and to an optical add path on which an optical add signal may be carried, said optical combiner combining the express optical signal having particular wavelengths expressed by said wavelength blocker and the optical add signal;

wherein the reconfigurable optical add-drop multiplexer may be expanded or contracted by adding or subtracting said pluggable optical filters from the cassette; and wherein the reconfigurable optical add-drop multiplexer may be further expanded or contracted by adding or subtracting pluggable optical filters from the second cassette.

2. A reconfigurable optical add-drop multiplexer according to claim 1, wherein the optical add signal includes a plurality of add wavelength channels, the multiplexer further comprising:

an M:1 optical combiner optically coupled to said optical combiner; said M:1 optical combiner optically combining the plurality of add wavelength channels for output to said optical combiner.

3. A reconfigurable optical add-drop multiplexer according to claim 2, wherein the plurality of add wavelength channels is a first plurality of add wavelength channels, the multiplexer further comprising:

an expansion optical combiner optically coupled to an input port of said M:1 optical combiner; said expansion optical combiner optically combining a second plurality of add wavelength channels that are further combined with the first plurality of add wavelength channels for output to said optical combiner.

4. A reconfigurable optical add-drop multiplexer according to claim 1, further comprising:

a plurality of pluggable optical add filters;

each of said pluggable optical add filters having an input port, an output port and an upgrade port, said pluggable optical filters being optically coupled in a daisy chain such that respective upgrade port(s) are connected to corresponding output port(s) in the daisy chain;

each of said pluggable optical add filters combining a wavelength channel from its input port with wavelength channel(s) from its upgrade port and outputting the combined wavelength channels on its output port, wherein the reconfigurable optical add-drop multiplexer may be expanded or contracted by adding or subtracting pluggable optical add filters to/from the daisy chain.

5. A reconfigurable optical add-drop multiplexer according to claim 4, wherein the pluggable optical filters each include at least one fiber Bragg grating.

6. A reconfigurable optical add-drop multiplexer according to claim 1, further comprising:

a plurality of said pluggable optical filters each of which includes an optical circulator having a first port, second port and third port, said optical circulators interconnecting the pluggable optical filters into a daisy chain;

said pluggable optical filters filtering wavelengths so as to output a particular wavelength channel for combination with other particular wavelength channel(s) in a corresponding optical circulator in the daisy chain and to reject a remainder of the wavelengths.

7. A reconfigurable optical add-drop multiplexer according to claim 1, further comprising:

a dispersion compensating module optically interposed between said optical splitter and said optical combiner, said dispersion compensating module providing dispersion compensation to the express optical signal.

8. A reconfigurable optical add-drop multiplexer according to claim 1, further comprising:

an optical amplifier optically interposed between said optical splitter and said optical combiner, said optical amplifier imparting optical gain to the express optical signal.

9. A reconfigurable optical add-drop multiplexer according to claim 1, further comprising:

a variable optical attenuator optically interposed between said optical splitter and said optical combiner, said variable optical attenuator optically attenuating the express optical signal.

10. A reconfigurable optical add-drop multiplexer according to claim 1, further comprising:

an optical amplifier optically coupled to an output of said optical combiner, said optical amplifier imparting optical gain to an output signal of said optical combiner.

11. A reconfigurable optical add-drop multiplexer according to claim 1, said wavelength blocker being reconfigurable such that different particular wavelengths in the express optical signal are blocked.

12. A reconfigurable optical add-drop multiplexer, comprising:

an optical splitter receiving an input optical signal and splitting the input optical signal into a dropped optical signal and an express optical signal;

a wavelength blocker optically coupled to said optical splitter, said wavelength blocker blocking particular wavelengths in the express optical signal;

a cassette having a plurality of slots capable of accepting a plurality of pluggable optical filters;

a plurality of pluggable optical filters optically coupled to said optical splitter, each of said pluggable optical filters filtering wavelengths so as to output a particular wavelength channel from the dropped optical signal;

each of said pluggable optical filters having an input port, an output port and an upgrade port;

said pluggable optical filters being optically coupled in a daisy chain such that respective upgrade port(s) are connected to corresponding input port(s) in the daisy chain;

each of said pluggable optical filters filtering wavelengths so as to output a particular wavelength channel from the dropped optical signal on its output port and a remainder of the wavelengths on its upgrade port; and an optical combiner optically coupled to said wavelength blocker and to an optical add path on which an optical add signal may be carried, said optical combiner combining the express optical signal having particular wavelengths expressed by said wavelength blocker and the optical add signal;

wherein the reconfigurable optical add-drop multiplexer may be expanded or contracted by adding or subtracting pluggable optical filters to/from the daisy chain.

13. A reconfigurable optical add-drop multiplexer, comprising:

an optical splitter receiving an input optical signal and splitting the input optical signal into a dropped optical signal and an express optical signal;

a wavelength blocker optically coupled to said optical splitter, said wavelength blocker blocking particular wavelengths in the express optical signal;

a cassette having a plurality of slots capable of accepting a plurality of pluggable optical filters;

a plurality of pluggable optical filters optically coupled to said optical splitter, each of said pluggable optical filters filtering wavelengths so as to output a particular wavelength channel from the dropped optical signal;

each of said pluggable optical filters including an optical circulator having a first port, second port and third port, said optical circulators interconnecting the pluggable optical filters into a daisy chain;

said pluggable optical filters filtering wavelengths so as to output a particular wavelength channel from the dropped optical signal and a remainder of the wavelengths to its corresponding optical circulator for passage to a next pluggable optical filter in the daisy chain; and an optical combiner optically coupled to said wavelength blocker and to an optical add path on which an optical add signal may be carried, said optical combiner combining the express optical signal having particular wavelengths expressed by said wavelength blocker and the optical add signal.

14. A reconfigurable optical add-drop multiplexer according to claim 13, wherein the pluggable optical filters each include at least one fiber Bragg grating.

15. A reconfigurable optical add-drop multiplexer, comprising:

an optical splitter receiving an input optical signal and splitting the input optical signal into a dropped optical signal and an express optical signal;

a wavelength blocker optically coupled to said optical splitter, said wavelength blocker blocking particular wavelengths in the express optical signal;

a cassette having a plurality of slots capable of accepting a plurality of pluggable optical filters;

at least one pluggable optical filter optically coupled to said optical splitter, said pluggable optical filter filtering wavelengths so as to output a particular wavelength channel from the dropped optical signal;

a plurality of said pluggable optical filters;

a 1:N optical splitter optically interposed between said optical splitter and said pluggable optical filters, said 1:N optical splitter splitting the dropped optical signal into N dropped optical signals at least some of which are respectively coupled to a corresponding one of said pluggable optical filters;

each of said pluggable optical filters filtering wavelengths so as to output a particular wavelength channel from the dropped optical signal, an optical combiner optically coupled to said wavelength blocker and to an optical add path on which an optical add signal may be carried, said optical combiner combining the express optical signal having particular wavelengths blocked by said wavelength blocker and the optical add signal, wherein the reconfigurable optical add-drop multiplexer may be expanded or contracted by adding or subtracting said pluggable optical filters to/from the cassette, wherein the optical add signal includes a plurality of add wavelength channels;

an M:1 optical combiner optically coupled to said optical combiner; said M:1 optical combiner optically combining the plurality of add wavelength channels for output to said optical combiner;

an expansion port/splitter optically coupled to an output port of said 1:N optical splitter, said expansion port/splitter splitting one of the N dropped optical signals at least some of which are respectively coupled to a corresponding one of said pluggable optical filters; and a second cassette having a plurality of slots capable of accepting a plurality of said pluggable optical filters;

wherein the reconfigurable optical add-drop multiplexer may be further expanded or contracted by adding or subtracting pluggable optical filters from the second cassette.

16. A reconfigurable optical add-drop multiplexer according to claim 15, wherein the plurality of add wavelength channels is a first plurality of add wavelength channels, the multiplexer further comprising:

an expansion optical combiner optically coupled to an input port of said M:1 optical combiner; said expansion optical combiner optically combining a second plurality of add wavelength channels that are further combined with the first plurality of add wavelength channels for output to said optical combiner.

17. A reconfigurable optical add-drop multiplexer, comprising:

an input port;

an output port;

a drop path optically coupled to said input port via an optical splitter;

an add path optically coupled to said output port via an optical combiner;

an express path optically coupled to both said optical splitter and to said optical combiner;

a wavelength blocker optically interposed between said drop path and said add path and along said express path;

an 1:N optical splitter optically coupled to said drop path and optically splitting an optical signal on the drop path into n dropped optical signals;

at least one pluggable channel filter optically coupled to said 1:N optical splitter, said pluggable channel filter filtering a wavelength channel from one of the N dropped optical signals; and a cassette having a plurality of slots;

said pluggable channel filter being adapted to be plugged into said cassette;

wherein said pluggable channel filter may be plugged into said cassette without disrupting other wavelength channels from the N dropped optical signals.

18. A reconfigurable optical add-drop multiplexer according to claim 17, further comprising:

an optical power control element optically interposed on the add path or drop path, said optical power control element controlling an optical power of optical signals on the add path or drop path.

* * * * *